United States Patent [19]
Hirai et al.

[11] Patent Number: 5,630,620
[45] Date of Patent: May 20, 1997

[54] REINFORCED THERMOPLASTIC RESIN FILM AIR BAG

[75] Inventors: Kinji Hirai, Kanagawa; Hiroshi Tomita, Shiga, both of Japan

[73] Assignee: Takata Corporation, Tokyo, Japan

[21] Appl. No.: 521,181

[22] Filed: Aug. 30, 1995

[30] Foreign Application Priority Data

Sep. 1, 1994 [JP] Japan .................. 6-208567

[51] Int. Cl.$^6$ .................................. B60R 21/16
[52] U.S. Cl. ..................... 280/743.1; 280/728.1
[58] Field of Search ................ 280/743.1, 728.1, 280/731, 732, 730.1, 743.2

[56] References Cited

U.S. PATENT DOCUMENTS

| | | | |
|---|---|---|---|
| 4,963,412 | 10/1990 | Kokeguchi | 280/743.1 |
| 5,114,180 | 5/1992 | Kami et al. | 280/743.1 |
| 5,452,914 | 9/1995 | Hirai | 280/743.1 |

FOREIGN PATENT DOCUMENTS

| | | | |
|---|---|---|---|
| 2552815 | 5/1977 | Germany | 280/743.2 |
| 2-31965 | 2/1990 | Japan . | |
| 2-237837 | 9/1990 | Japan | 280/743.1 |
| 4-266544 | 9/1992 | Japan . | |
| 4-356249 | 12/1992 | Japan | 280/728.1 |
| 91/18760 | 12/1991 | WIPO | 280/743.1 |

Primary Examiner—Brian L. Johnson
Assistant Examiner—Peter C. English
Attorney, Agent, or Firm—Kanesaka & Takeuchi

[57] ABSTRACT

An air bag is formed of a plurality of thermoplastic resin films fused together, wherein the thermoplastic resin films include a first film and second film which are superposed on each other and fused together by heat sealing along the peripheries thereof. Third thermoplastic resin films are superposed on a fused portion of the first and second films and fused together with the first and second films by heat sealing. The third thermoplastic resin films are disposed at the front side of the first film and at the front side of the second film.

6 Claims, 5 Drawing Sheets

REINFORCED THERMOPLASTIC RESIN FILM AIR BAG

FIELD OF THE INVENTION

The present invention relates to an air bag which is formed by a plurality of thermoplastic resin films fused to each other by heat sealing and more particularly, to an air bag with a fused portion of which provides greater strength.

BACKGROUND OF THE INVENTION

An air bag device is one for protecting an occupant upon deploying an air bag when a vehicle comes into collision.

A conventional air bag is usually made of woven fabric of fiber, such as polyamide fiber, the surface of which is coated with silicone rubber. Instead, an air bag made of resin films (Japanese Unexamined Patent Publication No. 2 (1990)-3 1965) and an air bag made of elastomer (Japanese Unexamined Patent Publication No. 4 (1992)-266544) have been proposed recently.

Particularly, an air bag made of thermoplastic resin films can be easily and efficiently manufactured upon fusing a plurality of thermoplastic resin films together by heat sealing, thereby allowing the simple manufacturing process. Therefore, it is quite effective from the industrial point of view.

The air bag made of thermoplastic resin films however has a problem that the thermoplastic resin films are easy to break along an edge of the fused portion when the air bag is deployed.

That is, as shown in FIG. 10, when two thermoplastic resin films 31, 32 are superposed and then fused together by heat sealing, the thermoplastic resin films are compressed at a fused portion 33 so that the thickness of the fused portion 33 is decreased. In addition, in cases of some films, the hardness of fused portion 33 is increased due to the fusing on the surface. There are portions 34, having a reduced thickness and strongly affected by heat, between the fused portion 33 and portions 35 not fused. While the thickness of the portions 35 is increased upon compressing the films 31 and 32 so that the strength of the portions 35 is increased, the strength of the portions 34 is relatively decreased due to its reduced thickness. When the air bag consisting of the thermoplastic resin films 31 and 32 fused together by heat sealing as mentioned above is deployed by great gas pressure from an inflator, as shown in FIG. 10, the portions 34 have a reduced thickness and the less strength which are boundaries between the fused portion 33 and the portion 35 having an increased thickness or its original thickness and thereby the original strength. Therefore, the portions 34 are stressed the most. In addition, since the thermoplastic resin films 31 and 32 are deployed while bending, the thermoplastic resin films 31 and 32 are easy to break along the boundaries (shown by a broken line in FIG. 10).

OBJECT AND SUMMARY OF THE INVENTION

It is an object of the present invention to solve the aforementioned conventional problem and to provide an air bag formed by a plurality of thermoplastic resin films superposed and fused together by heat sealing wherein the strength of the fused portion is increased, thereby having improved durability.

An air bag of the present invention is formed by a plurality of thermoplastic resin films fused together wherein the thermoplastic resin films comprise a first film and a second film which are superposed on each other and fused together by heat sealing along the peripheries thereof and wherein third thermoplastic resin films are superposed on a fused portion of the first and second films and fused together with the first and second films by heat sealing.

According to the air bag of the present invention, the thermoplastic resin films composing the air bag are prevented from breaking at the fused portion since the third thermoplastic resin films reinforce the fused portion and portions around the fused portion.

The third thermoplastic resin films are preferably disposed at the front side of the first film and at the front side of the second film. Therefore, the fused portion and portions around the fused portion are reinforced further well.

DESCRIPTION OF THE PREFERRED EMBODIMENTS

Figure 1:
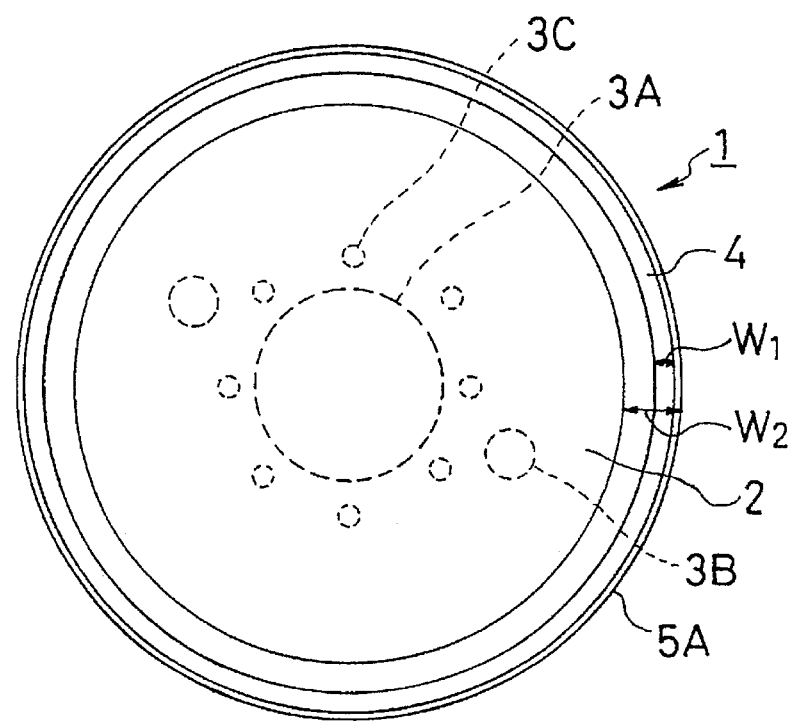
FIG. 1 is a plan view of an air bag for a driver, according to an embodiment of an air bag of the present invention.

Referring to the drawings, embodiments of the present invention will be described hereinafter.

Figure 2:
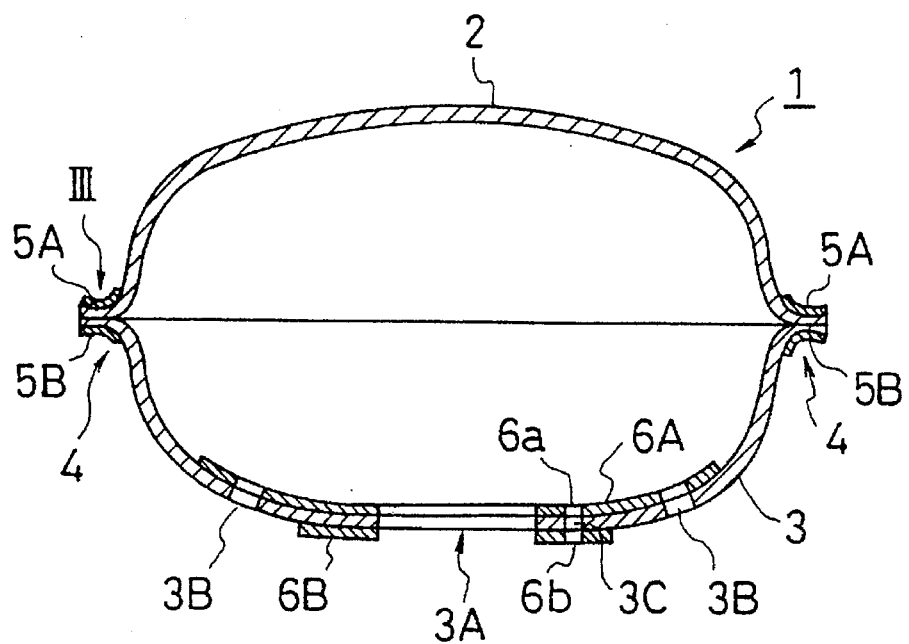
FIG. 2 is a sectional view showing the air bag shown in FIG. 1 in its deployed state.
Figure 3:
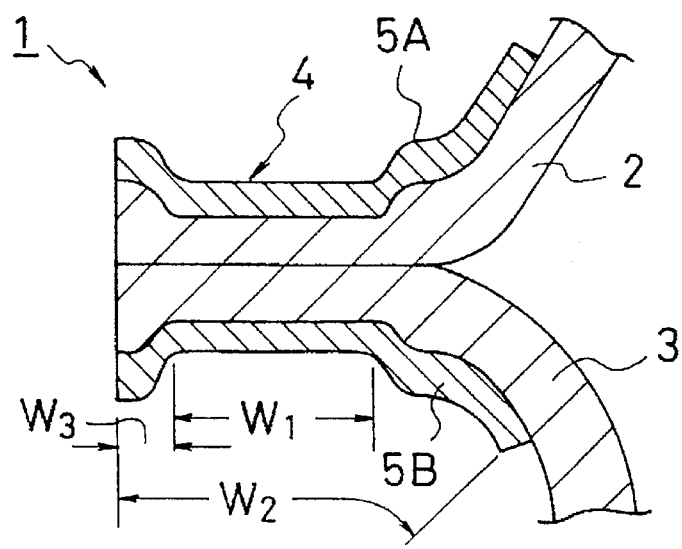
FIG. 3 is an enlarged view of the portion III in FIG. 2.

FIG. 1 is a plan view of an air bag for a driver (hereinafter, referred to as a driver air bag) according to an embodiment of an air bag of the present invention, FIG. 2 is a sectional view of the air bag in its deployed state, and FIG. 3 is an enlarged view of the portion III in FIG. 2.

An air bag 1 of this embodiment comprises a circular front panel 2 made of a thermoplastic resin film, a circular rear panel 3 made of a thermoplastic resin film and having an opening 3A at the middle thereof into which an inflator (not shown) is inserted, and third thermoplastic resin films disposed on a fused portion 4 between the front panel 2 and the rear panel 3, which are a reinforcing film 5A for the front panel 2 and a reinforcing film 5B for the rear panel 3. The reinforcing films 5A and 5B are each a ring-like film having an outer diameter substantially the same as that of the front panel 2 as rear panel 3. The air bag 1 of this embodiment is manufactured upon superposing the reinforcing film 5A, the front panel 2, the rear panel 3, and the reinforcing film 5B to arrange their peripheries uniformly and fusing them together around their peripheries by heat sealing.

In FIG. 1 and FIG. 2, reference numeral 3B designates a vent hole, 6A and 6B designate reinforcing films fused by heat sealing to an inner surface and an outer surface around the periphery of the opening 3A of the rear panel 3.

Reference numerals 3C, 6a, and 6b are holes for fixing bolts to fix the rear panel 3, the films 6A and 6B to the inflator (not shown), respectively.

Figure 4:
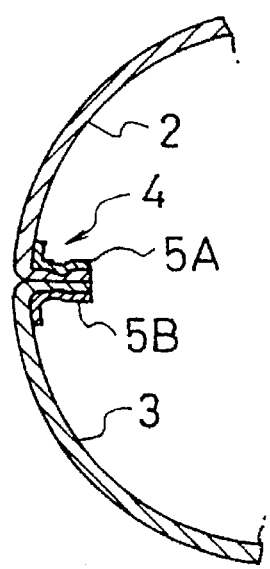
FIG. 4 is a sectional view showing another embodiment of the air bag for a driver according to the present invention.

As for the air bag of the present invention, though the fused portion is positioned outside the air bag in the embodiment shown in FIGS. 1–3, the fused portion 4 may be positioned inside the air bag as shown in FIG. 4. In FIG. 4, reference numerals 2, 3, 5A, and 5B designate the same members as shown in FIGS. 1–3.

The present invention can be applied to not only such a driver air bag but also an air bag for an occupant in a passenger seat and a rear seat (hereinafter, referred to a passenger air bag).

Figure 5:
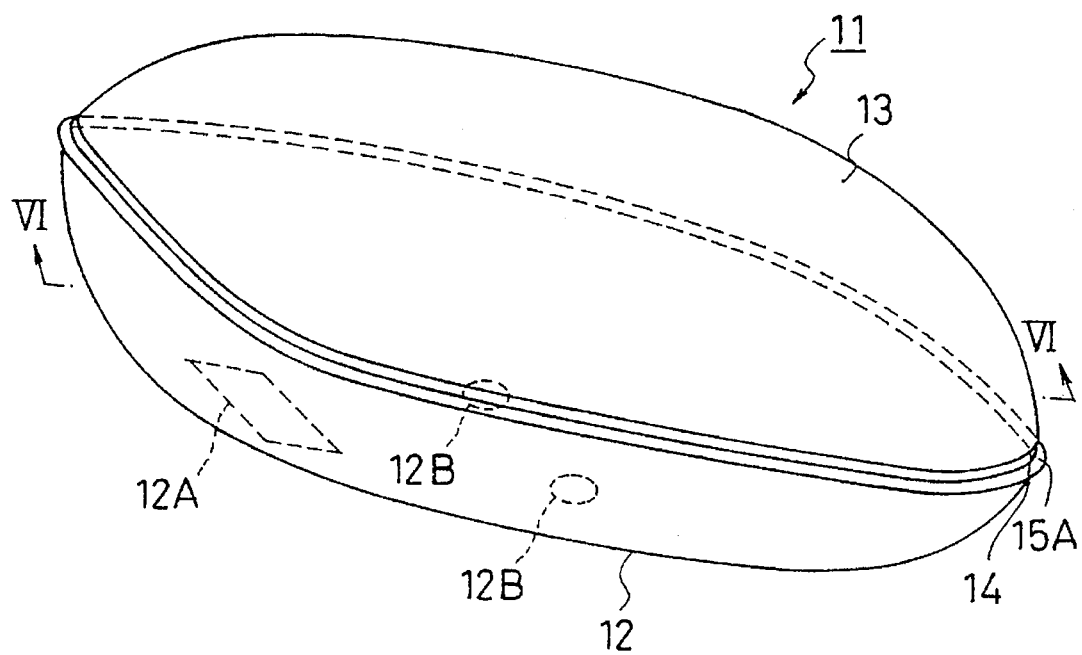
FIG. 5 is a perspective view of an air bag for an occupant in a passenger seat or a rear seat, showing still another embodiment of the air bag of the present invention.
Figure 6:
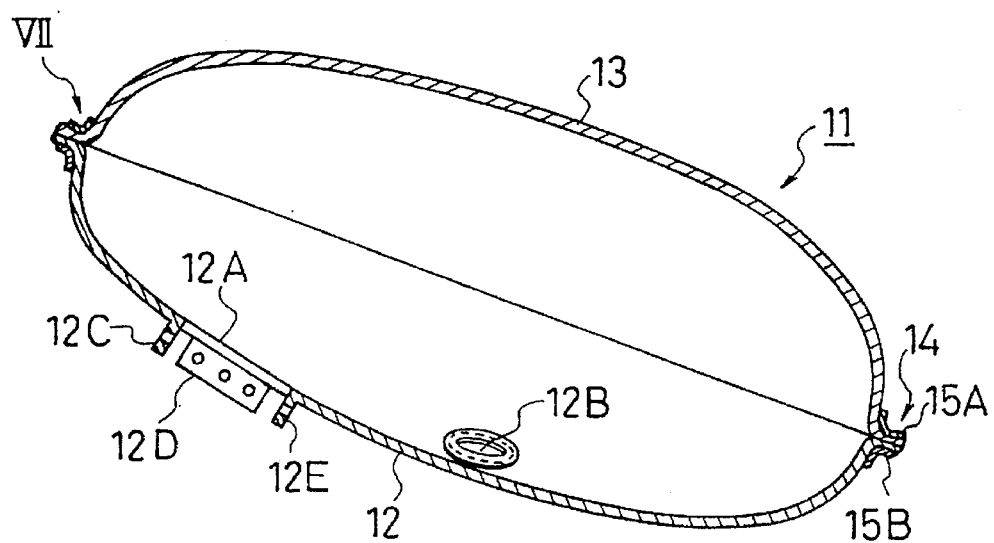
FIG. 6 is a sectional view taken along the line VI—VI showing the air bag shown in FIG. 5.
Figure 7:
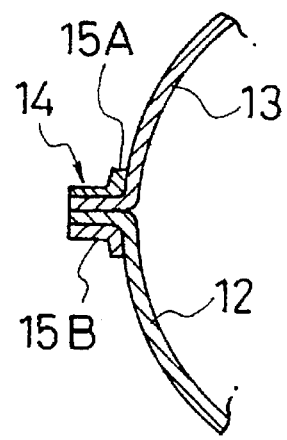
FIG. 7 is an enlarged view of the portion VII in FIG. 6.

FIG. 5 is a perspective view of a passenger air bag, showing another embodiment of the air bag of the present invention, FIG. 6 is a sectional view taken along the line VI—VI in FIG. 5, and FIG. 7 is an enlarged view of the portion VII in FIG. 6.

An air bag 11 of this embodiment comprises two thermoplastic resin films, that is, a lower panel 12 and an upper panel 13, and reinforcing films 15A, 15B, wherein the reinforcing films 15A, 15B are superposed on a fused portion 14 of the lower panel 12 and the upper panel 13, and are fused at the same time that the lower panel 12 and the upper panel 13 are fused to each other by heat sealing to be formed in a bag-like shape. That is, the reinforcing films 15A and 15B are each formed in an oval ring shape substantially the same as the peripheral shape of the lower panel 12 and the upper panel 13. The air bag 11 is manufactured upon superposing the reinforcing film 15A, the upper panel 13, the lower panel 12, and the reinforcing film 15B to arrange their peripheries uniformly and fusing them together around their peripheries by heat sealing.

The air bag 11 is structured to be deployed toward a connection between a seat cushion and a seat back of a vehicle seat.

The lower panel 12 is provided with an opening 12A for receiving gases from an inflator (not shown) and vent holes 12B. The lower panel 12 has flaps 12C, 12D, 12E fused thereto around the periphery of the opening 12A by heat sealing. It should be noted that reinforcing films are preferably superposed on fused portions of the flaps 12C, 12D, 12E and the lower panel 12, and fused at the same time as the flaps 12C, 12D, 12E are fused on the lower panel by heat sealing.

Figure 8:
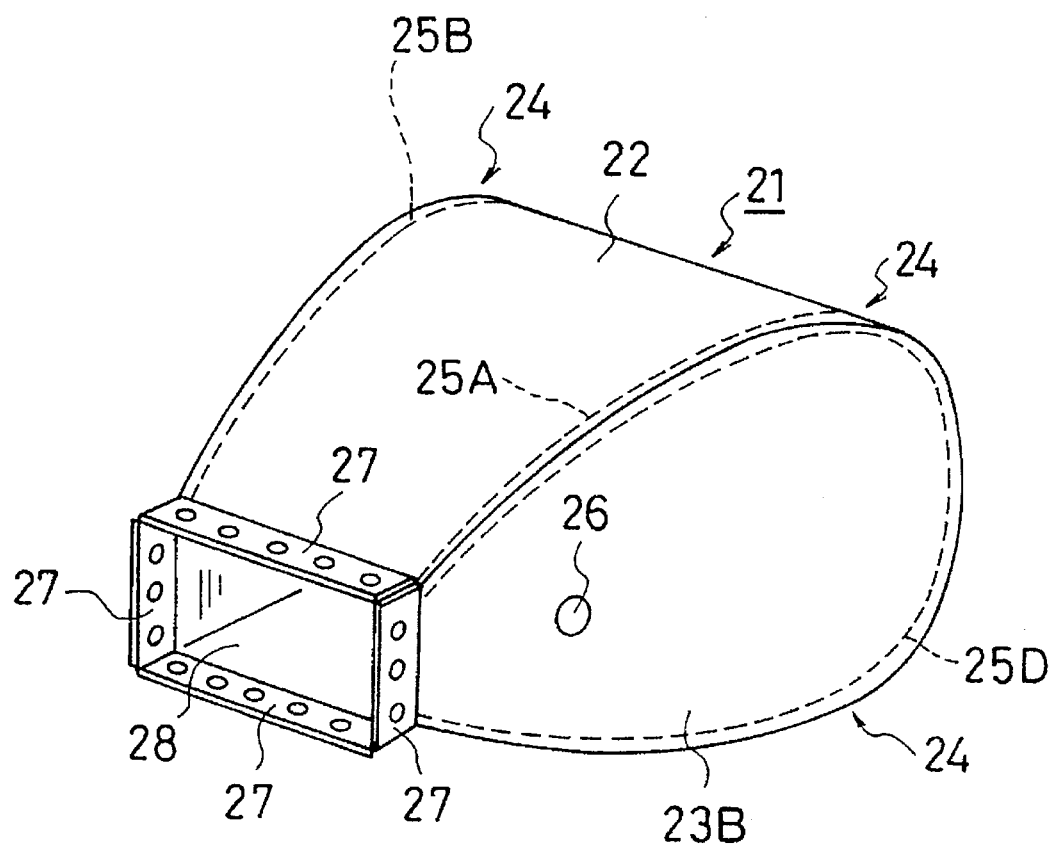
FIG. 8 is a perspective view of an air bag for an occupant in a passenger seat or a rear seat, showing still another embodiment of the air bag of the present invention.
Figure 9:
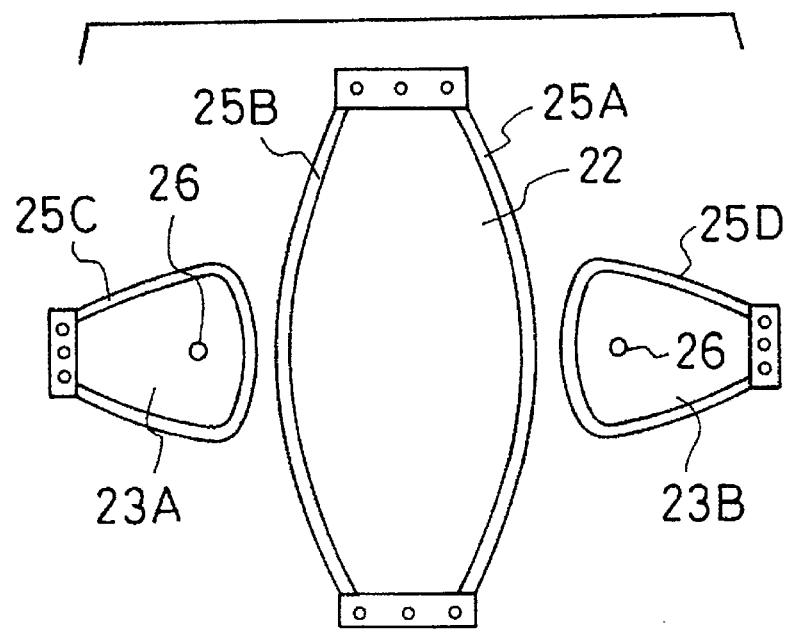
FIG. 9 is an exploded view showing panels of the air bag shown in FIG. 8.
Figure 10:
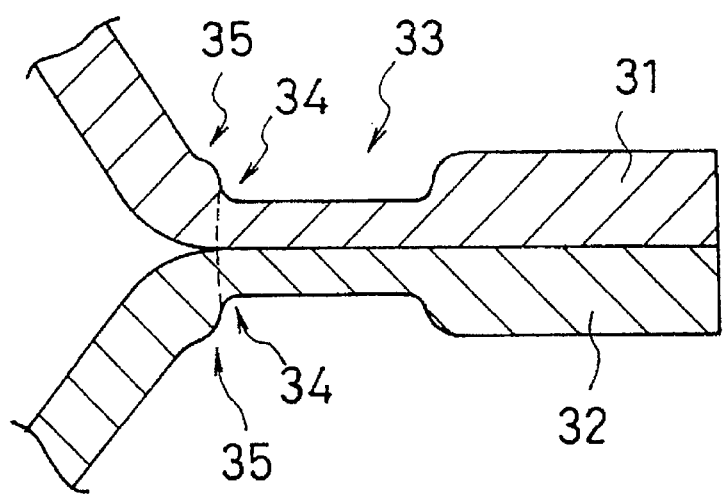
FIG. 10 is a sectional view showing a fused portion of a conventional air bag.

A passenger air bag 21 as shown in FIG. 8 and FIG. 9 comprises three thermoplastic resin films, that is, a center panel 22 and side panels 23A, 23B, and reinforcing films 25A, 25B, 25C, 25D wherein the reinforcing films 25A, 25B, 25C, 25D are superposed on fused portions 24 of the center panel 22 and the side panels 23A, 23B, and are fused at the same time that the side panels 23A, 23B are fused to the center panel 22 by heat sealing to be formed in a bag-like shape.

That is, the reinforcing films 25A, 25B are formed in band shape to lie along side edges of the center panel 22, respectively. The reinforcing films 25C, 25D are formed in U-like band shape to lie along peripheral edges of the side panels 23A, 23B, respectively. The air bag 21 is manufactured upon, at one side edge of the center panel 22, superposing the reinforcing film 25A, the center panel 22, the side panel 23B, and the reinforcing film 25D and then fusing them together by heat sealing and, at the other side edge of the center panel 22, superposing the reinforcing film 25B, the center panel 22, the side panel 23A, and the reinforcing film 25C and then fusing them together by heat sealing.

In FIG. 8 and FIG. 9, reference numeral 26 designates a vent hole, 27 designates flaps, and 28 designates an opening for receiving gases from an inflator.

Through, in the air bag shown in FIGS. 8 and 9, the fused portions are positioned inside the air bag, the fused portions may be positioned outside the air bag as shown in FIGS. 5–7. As for the air bag shown in FIGS. 5–7, the fused portions may be inside the air bag.

In the present invention, the word "the thermoplastic resin film" used for the air bag means a thermoplastic resin film in wide sense containing a thermoplastic elastomer film, that is, including a thermoplastics film of polyethylene, polypropylene, polyamide, vinyl chloride, polyvinylidene chloride, polycarbonate, polyester, and the like, and a thermoplastic elastomer film of urethane-type, ester-type, olefin-type, polyfluorocarbone-type, styrene-type, 1, 2-polybutadiene-type, amide-type, chlorinated polyethylene-type, and the like. The present invention is especially effective to the air bag consisting of the thermoplastic elastomer film having good flexibility among the aforementioned thermoplastic resin films.

As for the thickness of the thermoplastic resin films, that is, a first thermoplastic resin film and a second thermoplastic resin film, there is a problem that excessively thick films deteriorate the feeling of the occupant and increase the packaging volume of the air bag while excessively thin films decrease the strength. Therefore, normally, the thickness is preferably between 15 μm and 200 μm, more preferably between 25 μm and 100 μm in case of thermoplastics film, or preferably between 0.1 mm and 1.0 mm, more preferably between 0.2 mm and 0.5 mm in case of thermoplastic elastomer.

The third thermoplastic resin films for reinforcing the first and second thermoplastic resin films may be chosen among the materials as mentioned above for the first and second thermoplastic resin films. Normally, the first thermoplastic resin film, the second thermoplastic resin film, and the third thermoplastic resin films are preferably made from the same material.

There is a problem that the third thermoplastic resin film with an excessively small thickness does not provide the desired reinforcing effect while the third thermoplastic resin film with an excessively large thickness increases the packaging volume of the air bag. The preferred thickness of the third thermoplastic resin film may differ according to the material thereof. Normally, the thickness is preferably between 5 μm and 50 μm, more preferably between 10 μm and 25 μm in case of the thermoplastic film, or preferably between 0.05 mm and 0.5 mm, more preferably between 0.1 mm and 0.3 mm in case of thermoplastic elastomer.

Though it is enough that the third thermoplastic resin film can be disposed over the fused portion and there is no limitation with regard to the width of the third thermoplastic resin film, the width (e.g., $W_2$ in FIG. 1 and FIG. 3) of the third thermoplastic resin film is normally preferably between 6 mm and 30 mm, more preferably between 10 mm and 18 mm when the width (e.g., $W_1$ in FIG. 1 and FIG. 3) of the fused portion is between 2 mm and 10 mm. The width $W_3$ (in FIG. 3) between the fused portion and the edges of the first and second thermoplastic resin films is preferably between 1 mm and 10 mm, more preferably between 2 mm and 3 mm. Since the third thermoplastic resin film with an excessively small width does not provide the desired reinforcing effect while the third thermoplastic resin film with an excessively large width increases the packaging volume of the air bag and deteriorates the feeling of the occupant because the third thermoplastic resin film extends to the center of the air bag, the preferred width of the third thermoplastic resin film is within the range as mentioned above.

The air bag of the present invention in which the third thermoplastic resin films are disposed on the fused portion is manufactured upon previously lightly fusing or bonding portions of the thermoplastic resin films to portions to be fused of the thermoplastic resin films composing such as the front panel and the rear panel, i.e., the first thermoplastic resin film and the second thermoplastic resin film, by heat sealing or with adhesives, then superposing the first thermoplastic resin film and the second thermoplastic resin film with the third thermoplastic resin films fused thereto, and fusing them together by heat sealing in accordance with the normal process.

In this case, the adhesives for bonding the third thermoplastic resin film to the first and second thermoplastic resin films must be chosen to be suitable for resin. Generally, the adhesives may be urethane adhesives, acrylic adhesives, vinyl adhesives, rubber adhesives, or the like.

It should be understood that the third thermoplastic resin films are fused to surfaces of the first and second thermoplastic resin films, which stand up against the fused portion when the air bag is deployed. Therefore, the front sides of the first and second thermoplastic resin films as stated in the claims are not always meaning the front side of the air bag in the installed state and mean the opposite sides to the facing surfaces of the first and second thermoplastic resin films superposed on each other.

Though some of the air bags of the illustrated embodiments have the third thermoplastic resin films disposed on both surfaces of the fused portion at first thermoplastic resin film side and second thermoplastic resin film side, the third thermoplastic resin film may be disposed on only one surface of the fused portion of the thermoplastic resin films, which has a greater angle of standing up against the fused portion when the air bag is deployed.

As mentioned above, the present invention can provide an air bag consisting of a plurality of thermoplastic resin films superposed and fused together by heat sealing wherein the strength of the fused portion is increased and the durability is improved, thereby having good reliability.

What we claim:

1. A thermoplastic resin film air bag, comprising:

a plurality of thermoplastic resin films for constituting the air bag, said thermoplastic resin films having peripheries and being superposed together along the peripheries, and at least one reinforcing thermoplastic resin film superposed on at least one surfaces of the peripheries of the thermoplastic resin films opposite to facing surfaces superposed each other, said at least one reinforcing thermoplastic resin film and the thermoplastic resin films superposed together being fused and bonded together along the peripheries of the thermoplastic resin films inside the at least one reinforcing thermoplastic resin film to thereby securely connect the thermoplastic resin films while reinforcing a fuse bonded portion of the thermoplastic resin films, total thicknesses of the fuse bonded portion of the thermoplastic resin films and the at least one reinforcing thermoplastic resin film being less than total thicknesses of the thermoplastic resin films and the at least one reinforcing thermoplastic resin film outside the fuse bonded portion, the width of the fuse bonded portion being less than the width of the at least one reinforcing thermoplastic resin film and greater than the width between edges of the thermoplastic resin films and an edge of the fuse bonded portion near the edges of the thermoplastic resin films.

2. A thermoplastic resin film air bag according to claim 1, wherein said plurality of thermoplastic resin films includes two thermoplastic resin films and said at least one reinforcing thermoplastic resin film includes two reinforcing thermoplastic resin films, said two thermoplastic resin films being directly laminated together and sandwiched between said two reinforcing thermoplastic resin films.

3. A thermoplastic resin film air bag according to claim 2, wherein the thickness of each of the reinforcing thermoplastic resin films is less than the thickness of each of the thermoplastic resin films.

4. A thermoplastic resin film air bag according to claim 3, wherein the fuse bonded portion is located inside the air bag.

5. A thermoplastic resin film air bag according to claim 3, wherein the fuse bonded portion is located outside the air bag.

6. A thermoplastic resin film air bag according to claim 1, wherein one of the thermoplastic resin films includes an opening for receiving gas to deploy the air bag, and a plurality of flaps surrounding the opening, said flaps being fused to said one of the thermoplastic resin films around the opening.

* * * * *